(12) United States Patent
Kawamura et al.

(10) Patent No.: US 7,602,085 B2
(45) Date of Patent: Oct. 13, 2009

(54) COAL ENERGY UTILIZATION SYSTEM HAVING SUPERCONDUCTING POWER TRANSMISSION

(75) Inventors: Kuniaki Kawamura, Koto-ku (JP); Masamitsu Ikeuchi, Koto-ku (JP); Akito Machida, Koto-ku (JP)

(73) Assignee: Mayekawa Mfg. Co., Ltd. (JP)

( * ) Notice: Subject to any disclaimer, the term of this patent is extended or adjusted under 35 U.S.C. 154(b) by 592 days.

(21) Appl. No.: 11/195,853

(22) Filed: Aug. 3, 2005

(65) Prior Publication Data

US 2006/0056120 A1 Mar. 16, 2006

Related U.S. Application Data

(63) Continuation of application No. PCT/JP2004/004685, filed on Mar. 31, 2004.

(30) Foreign Application Priority Data

Mar. 31, 2003 (JP) .............................. 2003-093954

(51) Int. Cl.
*G05F 3/06* (2006.01)
(52) U.S. Cl. ...................... 307/147; 307/151
(58) Field of Classification Search .................. 307/42, 307/151, 147; 700/286, 297
See application file for complete search history.

(56) References Cited

U.S. PATENT DOCUMENTS

| | | | | |
|---|---|---|---|---|
| 3,394,555 A | * | 7/1968 | La Fleur | 62/643 |
| 4,947,007 A | * | 8/1990 | Dew et al. | 174/15.5 |
| 5,317,904 A | * | 6/1994 | Bronicki | 62/87 |
| 5,703,777 A | * | 12/1997 | Buchhop et al. | 701/109 |
| 6,354,087 B1 | * | 3/2002 | Nakahara et al. | 62/6 |
| 6,864,417 B2 | * | 3/2005 | Bechis et al. | 174/15.1 |
| 2001/0005802 A1 | | 6/2001 | Arita et al. | |
| 2002/0060497 A1 | * | 5/2002 | Arita et al. | 307/42 |
| 2002/0128749 A1 | | 9/2002 | Arita et al. | |

FOREIGN PATENT DOCUMENTS

| | | |
|---|---|---|
| JP | 5-308726 A | 11/1993 |
| JP | 10-92627 A | 4/1998 |
| JP | 11-299100 A | 10/1999 |

OTHER PUBLICATIONS

International search report Form PCT/ISA (second sheet); Japanese Patent Office; Jan. 2004; PCT/JP2004/004685; Mailing date May 18, 2004.

* cited by examiner

*Primary Examiner*—Albert W Paladini
*Assistant Examiner*—Daniel Cavallari
(74) *Attorney, Agent, or Firm*—Rossi, Kimms & McDowell LLP

(57) ABSTRACT

A system for utilizing coal energy includes a thermal power generator near a coal field area that converts coal energy of the coal field area located remotely from a demand end to electric energy. It also includes an alternating current load at a demand end side, an alternating current power distribution network, and an electric power transmission mechanism that transmit electric energy from the thermal power generator to the power distribution network. The electric power transmission mechanism is a combination of super conductive power transmitting system that transmit direct current electricity with small transmission loss utilizing super conductive power transmitting cables and a conventional power distribution network operating at ambient temperatures.

3 Claims, 5 Drawing Sheets

COAL ENERGY UTILIZATION SYSTEM HAVING SUPERCONDUCTING POWER TRANSMISSION

This is a continuation of International Application No. PCT/JP2004/004685 having an international filing date of 31 Mar. 2004; this International Application was not published in English, but in Japanese as WO 2004/088815.

BACKGROUND OF THE INVENTION

1. Field of the Invention

The present invention is related to a system for utilizing coal energy including peat energy, particularly to effective utilization of coal energy produced at a remote cold district, more particularly to an effective system for utilizing coal energy, wherein the coal is converted to electric energy at a production region by thermal power generation and the converted electric energy is transmitted to a demand end by combination of super conductive electric cables and a conventional power distribution network.

2. Description of the Related Art

Fossil fuels such as petroleum, natural gas, and coal is utilized for thermal power generation. Petroleum is transported by mammoth tankers or pipelines. Natural gas is transported by LNG ships or pipelines as liquid natural gas. Coal is transported by ore ships. However, as for problems of transportation of a fossil fuel to exportation bases from digging bases, of loading and unloading of a fossil fuel to and from ships, and of storage of a fossil fuel at importation bases or power plants, the coal has a big drawback in logistics condition compared with petroleum and natural gas.

Although petroleum and natural gas is transported by pipelines on land, transportation of coal by cars has problems of heavy weight and wastefulness. However, coal bears 30% energy supply of the world and is more abundant than petroleum. Therefore, energy transformation development of coal has been performed such as transformation to low cost liquid fuel or gaseous fuel. It has been studied that liquid or gaseous fuel, which is obtained by energy transformation at production regions, is used in Japan.

Many international cooperations are made concerning coal energy technology development. As bilateral cooperations, cooperation between Japan and U.S.A., and cooperation between Japan and Australia have been performed. Although, other than the above cases, coal producing countries such as China, Indonesia, Russia, Mongol, etc., cooperate with each other, they have not been practical.

Therefore, effective utilization of coal, whose amount of deposits is several times as much as that of petroleum or natural gas, is an issue of 21 century, though it is far more inferior to petroleum or natural gas among fossil fuels with regard to logistics.

Further, the amount of peat deposits in the world is as big as 500 billion to one trillion. Particularly, peat has low heat energy and is low on sulfur and ash, and is effective as biomass energy.

Meanwhile, as for demand and supply of electricity, peak load is increased as demand of electricity is abruptly increased based on different economical growth by different districts, so that satisfaction to the demand of electricity is imbalanced with respect to districts.

Particularly, as for supply and demand, absolute value of electricity demand as well as peak load has been increased so that load factor has been lowered year after year. To cope with the fact, necessity compels electric power companies to build power plants having as large capacities as suffice peak load.

To correspond to requirement of increasing capacity of electric power system, installation of power generating plants, power lines, and transformer stations is necessary for supplying the electric power matching with the increasing load. However, plant sites are hard to locate in the vicinity of cities. Besides, it is typical for the hydraulic resources to be far from the cities. Meanwhile, areas capable of using as a power generating plant is getting more difficult to acquire from a viewpoint of environmental problems, which makes it difficult to newly build a power plant.

There is CIGRE Keyone Address (Paris, Aug. 28, 1994) as an idea of collaboration involving many countries. In the literature, a collaboration system of Mediterranean region and a collaboration system of Africa region are shown. For example, in a collaboration system of Africa region, (1) a collaboration of peak loads in winter and summer, and (2) mitigation of daily peak demands by considering 4 hours time difference between west and east are described.

In order to dissolve the imbalance of satisfaction for regional power demands, realization of a wide area accommodation system of energy and electricity is strongly desired by considering regional difference. A power loss and difference of voltage among countries are big problems with regard to power transportation and accommodation utilizing a wide area power distribution network.

SUMMARY OF THE INVENTION

The present invention relates to a system for utilizing coal energy, wherein coal including peat energy of coal mines is converted to electric energy through thermal power generation utilizing effectively an electric power storage facility comprising super conductive power transmitting cables or super conductive coils and a conventional power distribution network, and the electric energy can be distributed to remote locations.

One aspect of the present invention is a system for utilizing coal energy comprises means for thermal power generation near a coal field area that converts coal energy of the coal field area, existing at a remote area different from a demand end, to electric energy by a thermal power generation. It further includes means alternating current load at a demand end side, an alternating current power distribution network, and means for electric power transmission that transmits electric energy from the means for thermal power generation near the coal field area to the power distribution network. The means for electric power transmission can be a combination of super conductive power transmitting system that transmits direct current electricity of small transmission loss utilizing super conductive power transmitting cables and a conventional power distribution network operating at ordinary temperatures. Electric energy is transmitted to the demand end through the alternating current power distribution network by converting alternating current at a feeding point of the power distribution network where the current is fed with an alternating current converting mechanism provided at the connecting end.

Further according to the present invention, the means for electric power transmission can be a normal power distribution network at normal temperature at the connecting end of which an electric power storage facility comprising a super conductive coil is provided and electric energy is transmitted to the demand end through the power distribution network, thereby power fluctuation at the demand end or the power plant side is absorbed.

The present system can be applied to a coalfield zone in cold remote districts of bad logistic condition such as Siberia, neighboring countries of Russia or Eastern Europe. The system is thought up instead of a conventional system in which coal produced in a production area is transported to a thermal plant at a demand end to generate electricity. While coal produced in a production area is converted at a thermal plant near the coal field so as to transmit on an existing power distribution network, a super conductive power transmitting cable having a function of storing electricity by itself is interposed therebetween or an electric power storage facility comprising super conductive coils is provided to transmit electricity to a power distribution network at a demand end. Consequently, fluctuation or stoppage of power can be absorbed by compensation since the power transmitting cable has a function of electric power storage even if fluctuation or stoppage of power occurs at the demand end side or the power plant.

As shown specifically in FIG. 5(B), instead of transmitting surplus power to a demand end side at a surplus power period like in spring or autumn or at night of the demand end, power is introduced through a flow divider 91 to super conductive cables 82, 83 at the part where a conventional power distribution network is not connected. After taking in the surplus power, a closed circuit is formed by shutting current by-pass circuits 92s, 94s to store the taken electric power. When a supplying amount of power runs short, dipping from a demand such as in summer or winter or at the day time of a demand end, the stored power is lead to a power cable 81 through a connector 93 by opening the current by-pass circuit 94s to transmit to the power distribution network at the demand end.

Further, as shown in FIG. 6, the same is the case of providing a electric power storage facility comprising a super conductive coil at a connecting end between a feeding line of a power plant side (a power generator in case of a delivery-with-pressure station) and a conventional power distribution network.

When a cross-channel region or a big river and the like lies therebetween, the means for electric power transmission is preferably provided with relay parts, between which a super conductive power transmitting cable is preferably provided or an electric power storage facility comprising a superconductive coil is preferably provided at a connecting end to the conventional power distribution network.

The means for electric power transmission can be power transmitting cables provided along natural gas pipelines along which delivery-with-pressure stations are provided at predetermined intervals. Waste heat thereof can be recovered by power generation with Rankine cycle. The generated electric power can be fed to the power transmitting cables through means for super conductive transmission of electricity or through electric storage facilities at the connecting ends comprising super conductive coils.

The means for thermal generation of coal, including peat field production region side, can be constructed between a plurality of systems or nations having thermal power plants. In this case, in view of absorbing load fluctuation between the power plants, power is preferably fed to the power transmitting cable between the power plants through an electric power storage facility comprising a super conductive coil at the connecting end.

Further, if an electric power storage facility comprising a super conductive coil is provided at receiving side of electricity after voltage is lowered at a transformer station, the cost can be cut down.

Means for supplying cooling energy for maintaining super conductive state can be installed together with means for transmitting electric power at the electric power storage facility comprising means for super conductive transmission of electricity or a super conductive coil utilizing a super conductive power transmission cable.

The connecting end of the super conductive power transmission cable and the demand side power distribution network can be provided with a power relay part comprising means for converting currents for converting direct current to alternating current and a power load adjusting means for regulating an appropriate power transmitting amount to the power distribution network by checking a state of power load from the demand side power distribution network disposed at the upstream of the means for converting currents. The means for converting currents and the means for adjusting power load can be super conductive apparatuses using means for supplying cooling energy.

The means for supplying cooling energy can be provided along the means for super conductive transmission of electricity, and that cooling energy can be supplied for maintaining super conductive state of superconductive apparatuses including the super conductive cable.

The means for supplying cooling energy can be provided in the district where the means for converting currents of the super conductive transmission cable which forms the means for transmitting electric power and the means for adjusting power load. The means for supplying cooling energy cools the super conductive cable and the super conductive apparatus. In case there is a relay part of the means for transmitting electric power, a electric power storage facility is preferably provided at the relay part.

The coal field zones of the remote district or cold district can include Siberia including Far East of Russian, CIS, Eastern Europe and further a deep district of China. Demand ends can include Japan, Korea, China coast area, or Russia city districts and developed countries in Europe.

The coal fields of neighboring countries of Russia (CIS), inland countries of China, Siberia district including Far East are scattered in undeveloped remote districts and have abundant amount of deposits. In order to transmit the electricity obtained thermal generation systems near the coalfields comprising thermal plants groups formed in these areas to alternating current power load systems in metropolitan regions of demand ends of electric power distribution networks such as urban areas in Russia, in developed countries in Europe, further urban areas along coast districts in China, urban areas in Korea or urban areas in neighboring countries of Russia, or to alternating current power load systems in metropolitan regions of demand ends of Japanese electric power distribution networks through Hokkaido, power needs to be transmitted for an extremely long distance. Therefore, in order to feed power to a district that does not have an existing power distribution network or to a power distribution network between power plants or natural gas pipe lines, power load fluctuation of power plant side (including a generator of a delivery station of natural gas), of a demand end side or a conventional electric power distribution network between nations or over a channel can be appropriately corresponded by feeding power with means for super conductive transmission of electricity having an electric power storage function and little power loss or through a electric power storage facility comprising super conductive coils to a connecting end of a conventional electric power distribution grid.

Further, as for a system for supplying cooling energy provided at a power feeding line or at a connecting end or a relay point of a conventional power distribution network, a cooling energy base can be formed in the installed sites of the means for converting currents, in the installed site of power load adjusting means, and at a plurality of relay parts, the cooling energy base being provided with a low temperature refrigerator producing cooling agent that cools a super conductive cable for transmitting direct current and a super conductive apparatus, a cooling agent storage tank that store the produced cooling agent, and a supplying pump disposed at the storage tank.

The system for supplying cooling energy cools means for converting currents provided at connecting ends of inlet and outlet of each power transmission system, which is a combination of means for superconductive transmission of electricity and a conventional power distribution network, and which reaches demand ends from a thermal plant, means for adjusting power load provided at the upstream of means for converting currents of a connecting end of a demand end power distribution network, and super conductive cables, to maintain a superconductive function.

The system for supplying cooling energy is provided with a storage tank for storing a generated cooling agent, and a pump for delivering the cooling agent to a super conductive cable and means for converting currents, and means for adjusting power load, along the system for electric power transmission.

The low temperature refrigerator in the system for supplying cooling energy can be constructed in such a manner that a refrigerating cycle by a refrigerator operated with carbon dioxide as a refrigerant, which is taken out as exhaust gas of a thermal plant, is connected with a refrigerating cycle of liquid nitrogen or extreme low temperature brine as a cascade structure so as to deliver extremely cooled cooling agent to a super conductive cable, means for converting currents, or means for adjusting power load.

Thus, since carbon dioxide and nitrogen are natural refrigerants, environment is not polluted, and, in addition, cooling for maintaining super conductive condition is possible.

Because the system for supplying cooling energy can be provided along power transmission systems by way of cold areas of Siberia, Sakhalin, and Hokkaido, it is appropriate that condensing temperature is not elevated even with a refrigerating cycle of carbon dioxide refrigerant. It is also preferable that gas recovered from combustion exhaust gas of power plants is used for environment protection.

Further, according to the above invention, hot heat source of high temperature water can be formed by sensible heat of condensation in case carbon dioxide is used as a refrigerant.

On account of recent development of high temperature super conductive material, super conductive state can be kept at a temperature region of liquid nitrogen. Hence, a brine of liquid nitrogen region can be used in the case of high temperature super conductive material.

Further, using slush nitrogen, which is a mixture of fine particles of solid nitrogen and liquid nitrogen, as a cooling agent results in more efficient utilization of cooling energy.

As a result of using slush nitrogen, which is a mixture of fine particles of solid nitrogen and liquid nitrogen, the cooling agent is superior in heat load absorption capacity so that it cools effectively super conductive power transmission cables or super conductive apparatuses.

Above-mentioned slush nitrogen can be produced by sucking and blowing liquid nitrogen together with low temperature cooling gas such as helium and mixing fine particles of nitrogen formed by blowing with liquid nitrogen.

As formerly stated, the power transmission system and natural gas pipelines are placed side by side; and electric power that is obtained by driving a steam turbine connected to an electric generator utilizing waste heat of gas turbine can be fed to the power transmission system. Since natural gas is also produced in a remote inland of Siberia, a pipeline of natural gas is extended to each port of a demand end. Therefore, power loss in an intervening path of the conventional power distribution network or the long distance between Siberia inland and Sakhalin or Hokkaido can be replenished if power, which is generated at every delivery station of the pipeline, is fed to a conventional power distribution network by means for super conductive transmission of electricity having small power loss for feeding over the power distribution network of the natural gas pipelines, or if power, which is generated at every delivery station of the pipeline, is fed to a connecting end of a conventional power distribution network through a power storage facility comprising a super conductive coil.

BRIEF DESCRIPTION OF THE DRAWINGS

FIG. 4(A) is a drawing showing a case wherein a power line from the delivery station is connected to a conventional power distribution network with a super conductive cable, and FIG. 4(B) is a drawing showing a case wherein means for converting currents and an electric power storage facility are provided at the connecting end of the above case.

FIG. 6(A) shows a state of charging or discharging period and FIG. 6(B) shows a state of power storing period.

DESCRIPTION OF THE PREFERRED EMBODIMENTS

The invention will now be described in detail by way of example with reference to the accompanying drawings. It should be understood, however, that the description herein of specific embodiments such as to the dimensions, the kinds of material, the configurations and the relative disposals of the elemental parts and the like, and the geographic locations, are not intended to limit the invention to the particular forms disclosed but the intention is to disclose for the sake of example unless otherwise specifically described.

First, referring to FIG. 5, a schematic drawing of a super conductive power transmitting system used in the present invention is explained.

For example, concerning a super conductive power transmitting system, a super conductive power transmitting technique capable of maintaining a power system stable by storing excess electric power and buffing an abrupt movement of power load wherein a construction cost as well as an operating cost are tried to be diminished is proposed on Japanese laid-open patent publication No. P1993-308726.

Figure 5A:
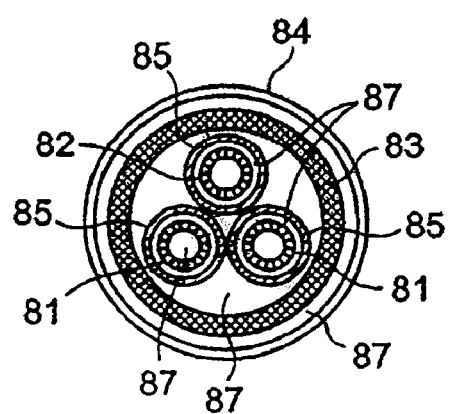
FIG. 5(A) is a drawing showing structures of a superconductive cable applied for the present invention and of a power cable capable of storing electric power.

As shown in FIG. 5(A), a power transmission cable 16 comprises a first super conductive cable 82 is disposed in parallel with a power cable 81. A second super conductive cable 83, wound like a coil in such a manner that the cable 83 contains the power cable 81 and super conductive cable 82, is provided. A cylinder shaped protective case or jacket 84 is provided outward thereof. An electrical insulating layer 85 is provided at the outer peripheral parts of the power cable 81 and the first super conductive cable 82. Liquid nitrogen 87 is filled in the protective case 84 so as to cool the power cable 81 and the super conductive cables 82 and 83.

Figure 5B:
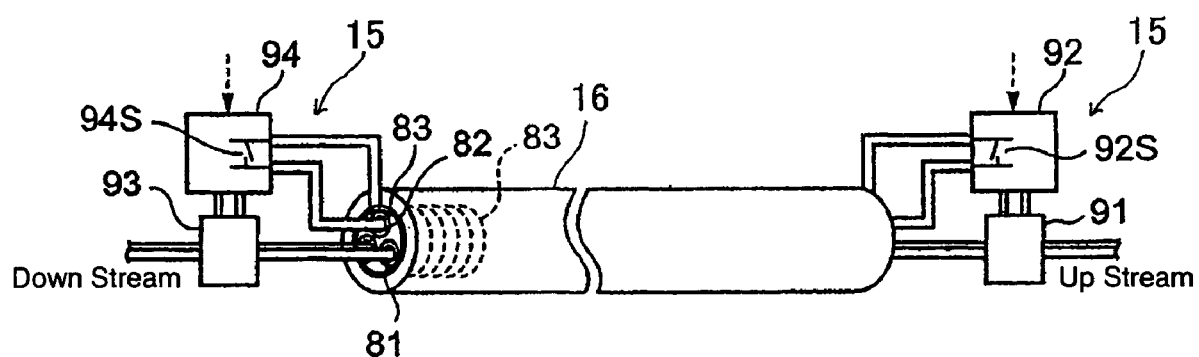
FIG. 5(B) is a drawing showing a case wherein power is stored with the cable shown in FIG. 5(A).

As shown in FIG. 5(B), a system for electric power transmission 12 comprises a thus configured power transmitting cable 16. The power transmitting cable 16 stores electric power only by means of combining the power cable 81, which transmits electricity, with the super conductive cables 82, 83, which store electric power.

According to the above proposal, the system for electric power transmission 12 is composed of the power transmitting cable 16 wherein the power cable 81, which transmits electricity, is combined with the super conductive cables 82, 83, which store electric power. In-taken redundant electric power is stored by introducing a redundant electricity to the super conductive cables 82, 83 through a flow divider with the action of an electric power converting device 92 and by forming a closed circuit with the closing action of current by-pass circuits 92s, 94s after redundant electric power is taken in.

When an amount of power supply dips from that of demand, that is when the power falls short, the stored electric power is introduced to the power cable 81 through a connector 93 by opening the current by-pass circuit 94s of an electric power converting device 94.

As described above, while an existing power transmission system is maintained as far as possible, a power storage function is added to a power transmission function so that buffing for fluctuation of load and stable operation of power transmission are made possible.

In other words, a power transmission system 12, which comprises a power transmitting cable 16, concerning the present proposal is a system in which a power cable 81, which transmits electric power, is combined with super conductive cables 82, 83, so that electric power storage is possible by providing a power transmission system 12 comprising the super conductive power transmitting cable 16.

More specifically, since a super conductive cable 3 forms an infinite distance solenoid type in the power transmission system 12, which comprises a power transmitting cable 16, an self-inductance per unit length L and a stored energy per unit length E can be expressed by following equations:

$$L = \mu \pi a^2 n^2 = \mu A n^2 \, [H/m] \quad (1)$$

$$E = (\tfrac{1}{2})LI^2 \, [J/m] \quad (2),$$

where μ: magnetic permeability, $4\pi 10^{-7}$ in the case of vacuum, n: a number of turns per unit length of the coil [turns/m], a: a radius of the center of the coil [m], I: electric current [A], and A: an average sectional area of the coil, $na^2$ [m²] respectively.

Since the stored energy E is proportional to current I squared and average sectional area of the coil A, the larger these values are, the larger electric power can be stored.

Figure 6A:
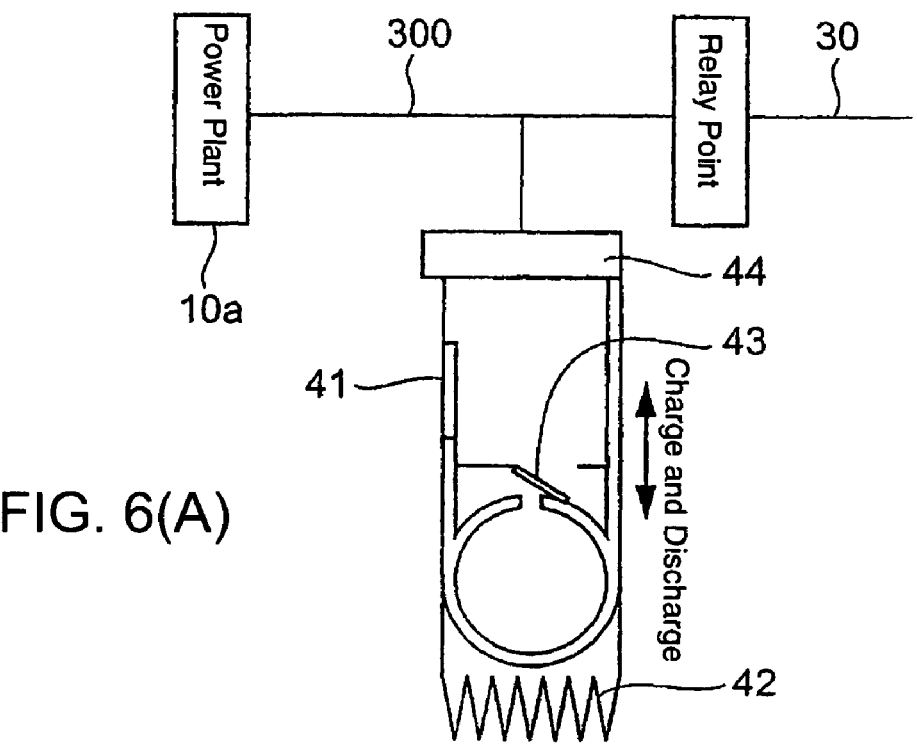
FIGS. 6(A)-6(B) illustrate a case where a super conductive power storage facility comprising means for converting currents and a super conductive coil in case a power transmission line from a power plant or a delivery station is connected to a conventional power distribution network, where

Another super conductive electric power storage facility 70 is shown in FIG. 6. In FIG. 6, 44 is an AC-DC converter which converts AC power from a power system to DC power; 41 is a DC breaker connected to the earth side; 42 is a super conductive coil; and 43 is DC breaker which bypasses between super conductive coils. As shown in FIG. 6(A), power can be charged and discharged by introducing electricity stored in the super conductive coil 42 to the power system 30 or by storing redundant electric power to the super conductive coil 42 whose electric resistance becomes zero by means of shutting the circuit with the DC breaker 41 or connecting the DC breaker 43 to the coil 42 side. Thus, it is possible to be prepared for load fluctuation of the power system 30.

Figure 6B:
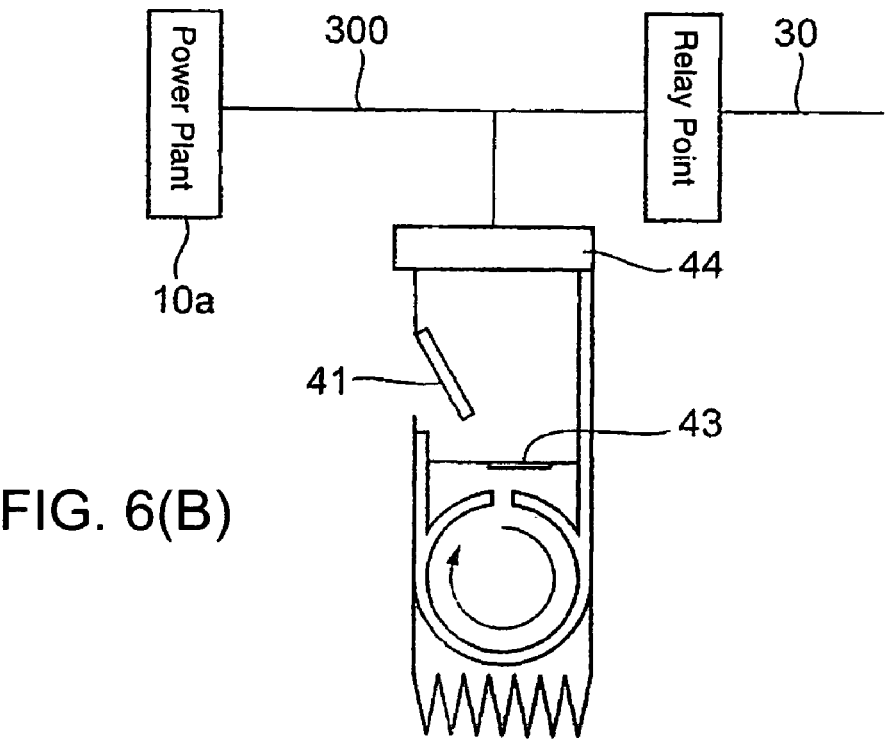

As shown in FIG. 6(B), when the DC breaker 41 is opened, electric energy can be stored in the super conductive coil by continuing to flow electric current in the super conductive coil, whose resistance becomes nearly zero, through the AC-DC converter 44 from the power system side 30.

Figure 1:
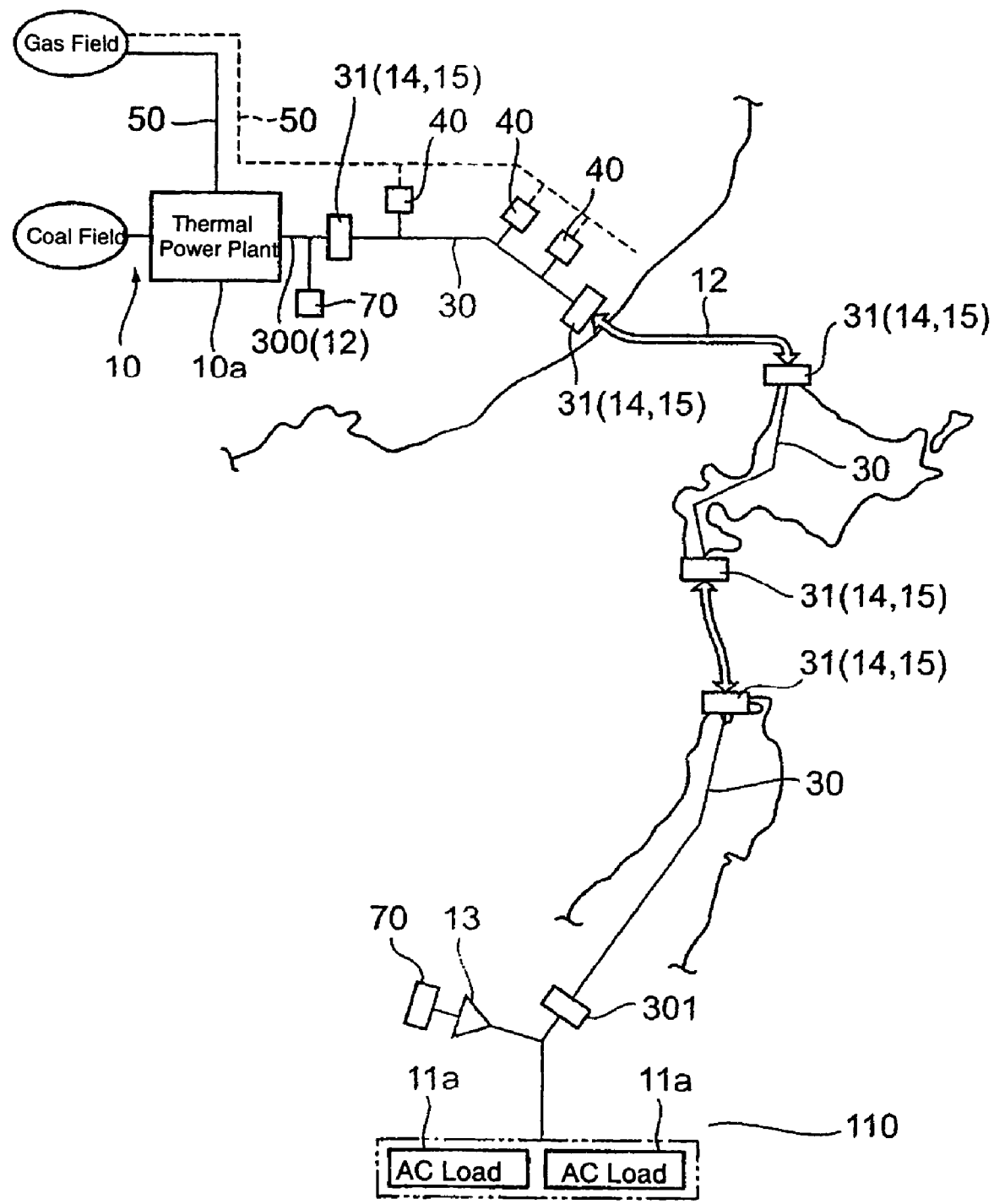
FIG. 1 is a pattern diagram showing a schematic construction of a system for supplying coal energy by super conductive transmission of electricity according to the present invention.

In FIG. 1, a system for electric power transmission is constructed in such a manner that a system for electric power transmission comprising the super conductive power transmitting cable 16 (hereinafter referred to as a super conductive power transmitting system 12), which has a function for storing electric power, such as from the power generator shown in FIG. 4, is combined with a conventional power distribution network 30 or a power transmission line 300 line (which can be either a super conductive power transmitting system 12 or a conventional power transmission line) provided along a natural gas pipe, so that electric power can be transmitted between a thermal power generation system 10 of a coal field side, which comprises a thermal power plant 10a provided in the vicinity of a coal (including peat) field, such as in an inland of Siberia, and a AC load system of demand end side 110 comprising AC loads at big city area, such as in Japan, which receives supply of electric power.

Until now, coal energy in cold remote districts such as inland Siberia has been unable to be developed because of bad logistics condition of cold remote districts although there are coal fields having abundant deposits. The thermal power generation system 10 having the thermal power plant 10a is constructed to convert coal energy to electric energy. The super conductive power transmitting system 12 or the conventional ordinary-temperature power transmitting line 300 can be installed on the ground or under the ground as a feeding line to the existing power distribution network 30.

When the power transmission line 300 is provided on the thermal power generation system 10 and the power transmission line 300 is connected to the conventional power distribution network 30 in this case, a super conductive power storage facility can be provided at the connecting end shown in FIG. 6(A).

Thus, electric power can be smoothly supplied even if power transmission is temporarily stopped at the side of the power transmission line 300 or load fluctuation occurs.

When the DC super conductive power transmitting system 12 is provided on the thermal power generation system 10 and the DC super conductive power transmitting system 12 is connected to the conventional power distribution network 30, it is only necessary to provide an AC-DC converter 13 at the connecting end, since the super conductive power transmitting system 12 itself has a function of storing electric power.

Because an installation cost of the super conductive power transmitting system 12 is high, it cannot be installed for a very long distance. Hence, a conventional existing power distribution network 30 is utilized or a power transmission line 300 is provided along a natural gas pipeline 50, such as those installed in Siberia and Sakhalin district. A natural gas pipeline in Siberia or Sakhalin is as long as over 1000 km, so that it is necessary to dispose delivery-with-pressure stations every 20 km distance along the pipeline.

A delivery-with-pressure compressor 41 of 100,000 horse powers is driven with a gas turbine 43 taking natural gas into a combustor 42 at the delivery-with-pressure station 40. Waste heat of the gas turbine, however, is not utilized, but discarded. If a power transmission line 300 is provided along a natural gas pipeline 50, electric power can be generated by Rankine cycle with waste heat from the gas turbine at the delivery station 40 SO as to feed the electric power to the power distribution network 30.

Particularly, if electric current is flowed for a long distance on the ordinary power distribution network 30, power loss is great, leading to big energy loss. However, power can be transmitted without loss when a steam turbine 46 connected to a generator 45 is driven with steam recovered from waste heat of a gas turbine by a boiler 44 so as to feed the power to the power distribution network 30, utilizing effectively the delivery-with-pressure station disposed every 20 km distance along the pipeline. In this case, a power generator 45 can be provided at the out put end of a delivery compressor 41 and the electric power can be fed to the power distribution network 30.

Figure 4A:
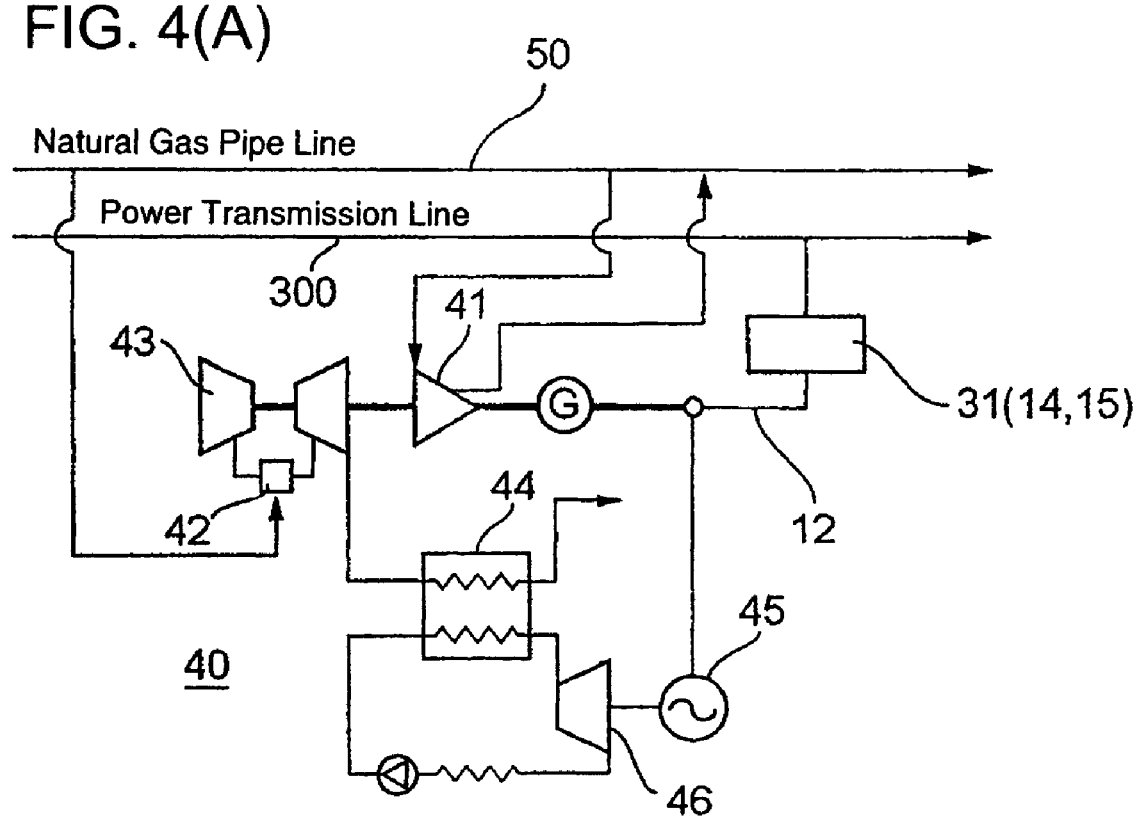
FIGS. 4(A)-4(B) are schematic illustrations of delivery station of a supply line of natural gas when a power transmission system is run along a natural gas pipeline, where
Figure 4B:
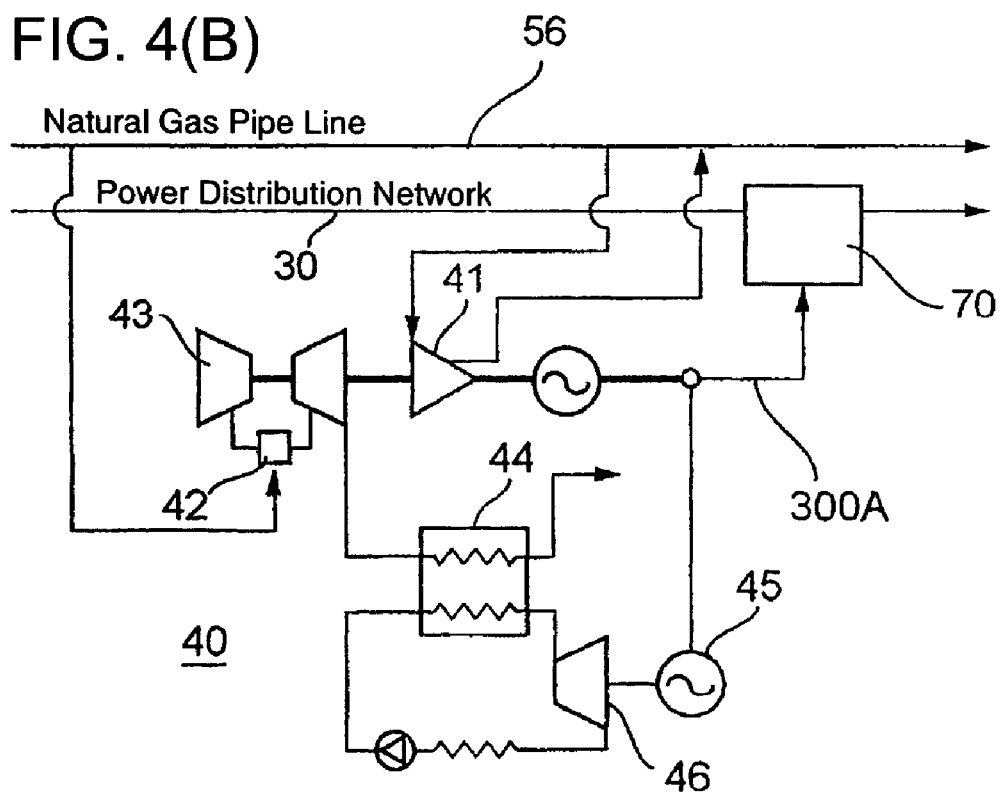

As shown in FIG. 4(B), an AC-DC converter 13 and a super conductive power storage facility 70 can be provided between a power distribution network 30 disposed on along a natural gas pipe line 50 and the connecting end of a feeding line 300A of delivery station side. As shown in FIG. 4(A), the feeding line itself can be a super conductive power transmitting system 12 so as to be connected to the conventional existing power distribution network 30. In this case, as the super conductive power transmitting system itself 12 has a power storage function, only an AC-DC converter need be provided on the connecting end.

If the heat efficiency of a gas turbine of 100,000 horse powers (75,000 kw) is 25-30%, when electric power is generated using 75-70% of waste heat with heat efficiency of 20%, electric power of 75,000 kw×3×0.2=45,000 kw is obtained without loss.

Specifically, a natural gas pipe line 50 of inland Siberia in the vicinity of coal fields extends between Siberia and Sakhalin having its length of 3000 km. 150 delivery stations 40 are provided to obtain 6,750,000 kw power of electricity. The generated power is transmitted using the pipe line network.

In addition, a measure for avoiding transmitting loss of power can be taken in such a manner that power is fed until the power distribution network 30 by combining an ordinary power transmission line 300 with a super conductive power transmitting system 12 through an AC-DC converter 13.

When a power distribution network 30 provided along a natural gas pipe line in the Russian side or an existing conventional power distribution network 30 is connected to a power distribution network in Japan, power is lowered or stopped on account of snow and others while passing in such remote area as Siberia or Sakhalin. Consequently, a relay station 31 at the connecting end between the Russian side and the Japanese side can be provided with a AC-DC converter 13 in conjunction with a super conductive power storage facility 70. Otherwise, a feeding line itself of the channel is made as a DC super conductive power transmitting system 12 through an AC-DC converter 13 and connected to the power distribution networks in the Russian side and the Japanese side. In this case, as the DC super conductive power transmitting system 12 itself has a power storage function, an AC-DC converter needs to be provided at the relay station of each connecting end between the Russian side and the Japanese side.

Means for adjusting the power load 15 is preferably provided at the connecting end to grasp the necessary power amount of a demand end in case a feeding line itself of a channel is a DC super conductive transmitting system 12.

As shown in FIGS. 5(A)-5(B), the means for adjusting power load 15 of a super conductive transmitting system 12 side comprises an electric power converting device 92, a flow divider 91, and current bypass circuits 92s, 94s ; means for adjusting power load 15 of a down stream side comprises an electric power converting device 94, a current bypass circuit 94s, and a connector 93.

In other words, since a power generating amount of a coal field side is independent from a necessary power amount of a demand end, a power storage function is inevitable for adjusting the load balance of both sides. If the function is formed at a coal field side, investment in the coal field side increases. If the function is formed at the demand end side, transmitting loss increases as power is stored through its power distribution network.

Hence, according to the present invention, current bypass circuits 92s, 94s are provided at each upstream end and down stream end of a super conductive transmitting system 12, which is laid down over a channel, and are utilized as a function of means for adjusting power load 15. Meanwhile, a power distribution network 30 of a power company in each district is connected to an AC load system 11 in a big city area, which is a demand end. Generally, AC flows in the power distribution network 30 so that any power distribution network 30 can be connected aside from voltage condition.

Thus, new power plants are not necessary to be constructed in the vicinity of a city area in a district where power accommodation such as the AC load system 11 in a city area of Japan is necessary, so that it contributes to environmental protection and the exhaust of carbon dioxide can be decreased. Particularly, surcharge for excess exhaust of carbon dioxide against a right of exhaust of carbon dioxide in a developed country needs not to be paid.

A feeding line itself over a channel between the main land and Hokkaido in Japan can be a DC super conductive transmitting system 12, the connecting end side (the relay station 31) of which is provided with means for adjusting power load 15 for grasping a necessary amount of power at a demand end.

In the present embodiment, feeding lines over a border with Russia and over Tsugaru channel can be DC super conductive transmitting systems 12, a relay station 31 side of the connecting end of which is provided with means for adjusting power load 15 for grasping a necessary amount of power at a demand end. However, further fluctuation of power demand can be coped with when several feeding lines between a relay station 31 as a power receiving point of the Japanese side and an AC load system 11 in a city area are provided with super conductive power transmitting systems 12 having a power storage function for connecting a commercial power transmission system comprising an AC power distribution network through an AC-DC converter 13.

Further, an AC-DC converter 13 shown in FIG. 4(B) and a super conductive power storage facility 70 can be provided at the down stream side of a transformer 301, or a DC super conductive power transmitting system 12 is provided as a feeding line itself as shown in FIG. 4(A) to connect to a existing power distribution network 30. In this case, as the super conductive power transmitting system 12 itself has a function to store electric power, only an AC-DC converter 13 is necessary to be provided. In this case, it can cope with a fluctuation of power load system in a city area.

When there is a natural gas field in the Russian side between a thermal plant 10a near coal fields and a relay station 31 as a power receiving point of the Russian side and the Japanese side, a power transmission line is provided along a natural gas pipe line 50. As described before, power fluctuation between both nations can be coped with by providing a super conductive cable 16 at an international boundary between Russia and Japan.

As described above, in the relay station 31 between the super conductive power transmitting system 12 and the power distribution network, an excess power is stored in the super conductive cable 16 and short AC power supply is covered by discharging AC power through the AC-DC converter 14*b*, corresponding to a power demand of the demand end of the AC load system 11 with the means for adjusting power load 15. Since the super conductive cable 16, the AC-DC converter 14*b*, and the means for adjusting power load 15 need to be maintained as a super conductive state, a cooling energy supplying system 113 shown in FIG. 2 is provided along the power transmitting system 12, which delivers cooling agent comprising extreme low temperature brine or liquid nitrogen.

The above cooling agent is not limited to liquid nitrogen, but slush nitrogen, which is a mixture of liquid nitrogen and fine particles of solid nitrogen can be used. As a result, slush nitrogen brings about excellent capacity for absorbing heat load so that it can effectively cools high temperature super conductive power transmitting cables or super conductive apparatuses.

The above slush nitrogen is produced by mixing liquid nitrogen with fine particles of solid nitrogen that is formed by sucking and blowing liquid nitrogen together with low temperature cooling gas such as helium.

Figure 2A:
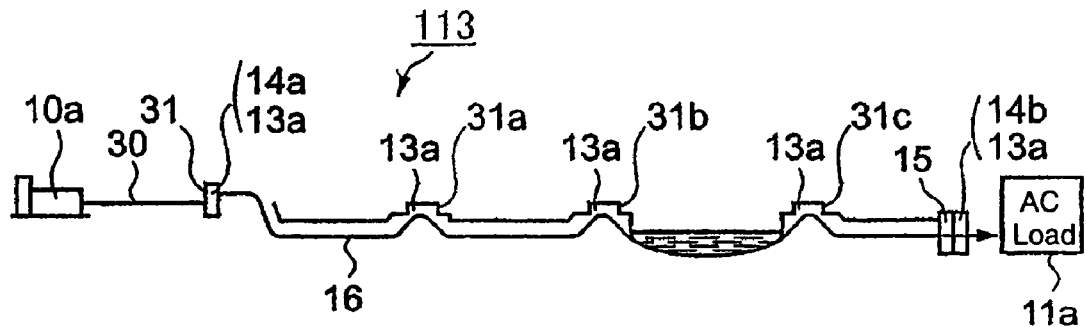
FIG. 2(A) is a schematic illustration of a system for supplying cooling energy provided along a power transmission system shown in FIG. 1.

Since the above cooling energy supplying system 113 enables delivery of the cooling agent all over the region of the super conductive transmitting system 12, as shown in FIG. 2(A), cooling energy supplying stations 13*a* are provided at various points such as the AC-DC converters 14*a*, 14*b* or relay stations 31*a*, 31*b*, 31*c*.

Figure 3:
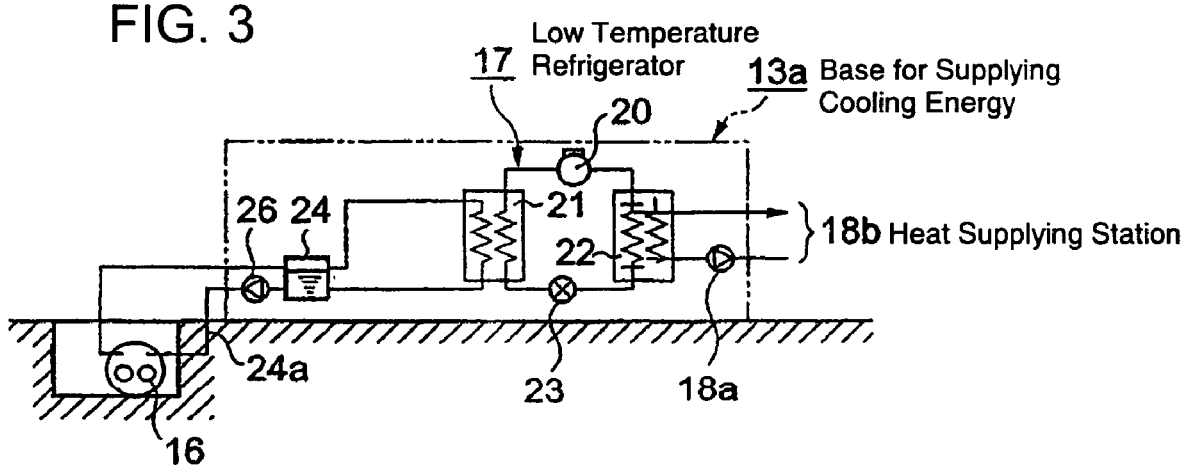
FIG. 3 is a schematic illustration of a base for supplying cooling energy shown in FIG. 2.

Further, as shown in FIG. 3, the above cooling energy supplying station 13*a* comprises a low temperature refrigerator 17, a storage tank 24, and a pump 26 for delivering cooling agent.

The low temperature refrigerator 17 comprises a compressor 20, a condenser 22, an expansion valve 23, and an evaporator 21 for generating cooling agent 24*a*. The generated cooling agent 24*a* is stored in the storage tank 24 and introduced to super conductive apparatuses such as the AC-DC converters 14*a*, 14*b* and the means for adjusting power load 15.

Figure 2B:
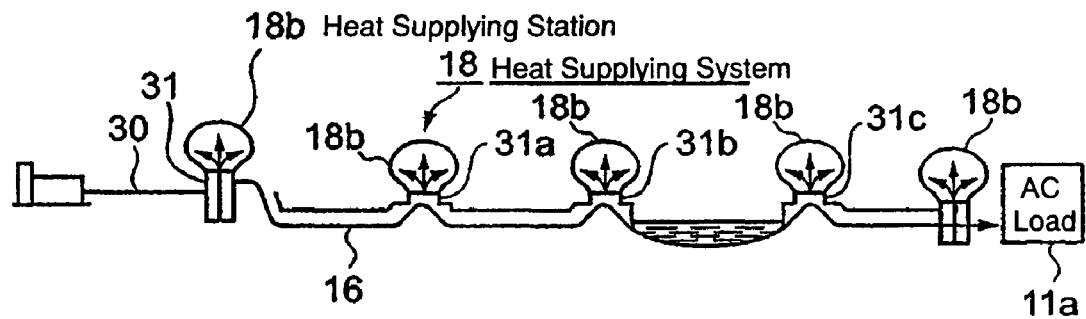
FIG. 2(B) is a schematic illustration of a system for supplying heat.

As shown in FIG. 2(B) and FIG. 3, a heat supplying system 18 is preferably installed by providing a heat supplying station 18*b* so that heat of condensation generated in the condenser 22 is supplied to an inhabited area around the cooling energy supplying station through a pump 18*a*.

The above low temperature refrigerator contributes to environment protection because carbon dioxide generated from exhaust gas of the thermal plants and the delivery stations in the thermal power generation system 10 in the vicinity of the coal fields. Heat of condensation of the carbon dioxide of the condenser side is utilized as heat for the heat supplying station 18.

Although extreme low temperature brine can be used as a cooling agent 24*a*, super conductive state can be maintained using liquid nitrogen in case of using oxide type high temperature super conductive material.

INDUSTRIAL APPLICABILITY

Industrial applicability according to the present invention arises as follows because of the above mentioned construction.

a. Coal, which is inferior to petroleum or natural gas in terms of logistics but is superior in terms of amount of deposits by several times that of petroleum or natural gas, is converted to electric power, which is advantageous for logistics, by thermal power generation to enable supplying stable coal energy.
 b. A problem of utilization of energy in wide region and measures for environmental protection can be performed intensively by thermally generating power on coal production sites. Further, recovered carbon dioxide, which is exhausted from thermal plants, can be used as refrigerant of a low temperature refrigerator for cooling super conductive material, which results in contributing to environmental protection.

Although the present invention has been described in connection with the illustrated embodiments, given the disclosure of the present invention, one versed in the art would appreciate that there can be other embodiments and modifications within the scope and spirit of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

This application is based on, and claims priority to, Japanese Application No. 2003-093954, filed on 31 Mar. 2003, and the disclosure of the priority application, in its entirety, including the drawings, claims, and the specification thereof, is incorporated herein by reference.

What is claimed is:

1. A system for utilizing coal energy located at a first location corresponding to a coal source to supply enemy to a demand end located at a second location separate from the first location, the system comprising:
 means for thermal power generation located at the first location that converts coal energy to electric energy by thermal power generation;
 an alternating current load located at the demand end; and
 means for electric power transmission that transmits electric enemy from the means for thermal power generation to the alternating current load;
 wherein the means for electric power transmission includes a combination of a super conductive power transmitting system that transmits direct current electricity utilizing at least one super conductive power transmitting cable, and a conventional alternating current power distribution network operating at normal temperatures;
 wherein electric energy is transmitted to the demand end through the alternating current power distribution network by converting the direct current transmitted by the super conductive power transmitting system to alternating current at a connecting end of the alternating current power distribution network where the super conductive power transmitting system is connected to the alternating power distribution network;
 wherein the super conductive power transmitting system includes first current conversion means for converting alternating current to direct current provided at an input side connecting end of the super conductive power transmitting system, second current conversion means for converting direct current to alternating current provided at a demand side connecting end of the super conductive power transmitting system, a super conducting cable for transmitting direct current provided therebetween, and a power load adjusting means for regulating an appropriate power transmitting amount of the super conductive power transmitting system in collaboration with the alternating current power distribution network;

wherein a cooling energy base is provided at installation sites of the first and second current conversion means, and in an installation site of the power load adjusting means, the cooling enemy base including a low temperature refrigerator that provides a cooling agent that cools the super conductive transmitting cable, a cooling agent storage tank that stores the cooling agent, and a supplying pump disposed at the storage tank;

wherein the low temperature refrigerator utilizes carbon dioxide as a refrigerant to cool the cooling agent, and wherein the low temperature refrigerator also functions as a heat supplying station that supplies heat from a condenser; and wherein the cooling agent comprises slush nitrogen that includes a mixture of fine particles of solid nitrogen and liquid nitrogen.

2. A system for utilizing coal energy located at a first location corresponding to a coal source to supply energy to a demand end located at a second location separate from the first location, the system comprising;

means for thermal power generation located at the first location that converts coal energy to electric energy by thermal power generation;

an alternating current load located at the demand end; and means for electric power transmission that transmits electric energy from the means for thermal power generation to the alternating current load;

wherein the means for electric power transmission includes a combination of a super conductive power transmitting system that transmits direct current electricity utilizing at least one super conductive power transmitting cable, and a conventional alternating current power distribution network operating at normal temperatures;

wherein electric enemy is transmitted to the demand end through the alternating current power distribution network by converting the direct current transmitted by the super conductive power transmitting system to alternating current at a connecting end of the alternating current power distribution network where the super conductive power transmitting system is connected to the alternating power distribution network;

wherein the means for electric power transmission includes at least one power transmitting cable provided along natural gas pipelines along which delivery-with-pressure stations are provided at predetermined intervals, wherein waste heat thereof is recovered by power generation with Rankine cycle, and the generated electric power is fed to the power transmitting cable through a means for super conductive transmission of electricity or through electric storage facilities including super conductive coils;

wherein the super conductive power transmitting system includes first current conversion means for converting alternating current to direct current provided at an input side connecting end of the super conductive power transmitting system, second current conversion means for converting direct current to alternating current provided at a demand side connecting end of the super conductive power transmitting system, a super conducting cable for transmitting direct current provided therebetween, and a power load adjusting means for regulating an appropriate power transmitting amount of the super conductive power transmitting system in collaboration with the alternating current power distribution network;

wherein a cooling energy base is provided at installation sites of the first and second current conversion means, and in an installation site of the power load adjusting means, the cooling energy base including a low temperature refrigerator that provides a cooling agent that cools the super conductive cable, a cooling agent storage tank that stores the cooling agent, and a supplying pump disposed at the storage tank;

wherein the low temperature refrigerator utilizes carbon dioxide as a refrigerant to cool the cooling agent, and wherein the low temperature refrigerator also functions as a heat supplying station that supplies heat from a condenser; and wherein the cooling agent comprises slush nitrogen that includes a mixture of fine particles of solid nitrogen and liquid nitrogen.

3. A system for utilizing coal energy, located at a first location corresponding to a coal source to supply energy to a demand end located at a second location separate from the first location, the system comprising:

means for thermal power generation located at the first location that converts coal energy to electric energy by thermal power generation;

an alternating current load located at the demand end; and means for electric power transmission that transmits electric energy from the means for thermal power generation to the alternating current load;

wherein the means for electric power transmission includes a conventional power distribution network at a normal temperature, and an electric power storage facility comprising a super conductive coil provide at a connecting end thereof, wherein the electric power storage facility absorbs power fluctuations in electric energy when the electric energy is transmitted from the means for thermal power generation to the alternating current load;

wherein the means for electric power transmission includes at least one power transmitting cable provided along natural gas pipelines along which delivery-with-pressure stations are provided at predetermined intervals, wherein waste heat thereof is recovered by power generation with Rankine cycle, and the generated electric power is fed to the power transmitting cable through a means for super conductive transmission of electricity or through electric storage facilities super conductive coils;

wherein the means for super conductive transmission of electricity includes first current conversion means for converting alternating current to direct current provided at an input side connecting end of the means for super conductive transmission of electricity, second current conversion means for converting direct current to alternating current provided at a demand side connecting end of the means for super conductive transmission of electricity, a super conducting cable for transmitting direct current provided therebetween, and a power load adjusting means for regulating an appropriate power transmitting amount of the means for super conductive power transmission;

wherein a cooling enemy base is provided at installation sites of the first and second current conversion means, and in an installation site of the power load adjusting means, the cooling energy base including a low temperature refrigerator that provides a cooling agent that cools the super conductive cable, a cooling agent storage tank that stores the cooling agent, and a supplying pump disposed at the storage tank;

wherein the low temperature refrigerator utilizes carbon dioxide as a refrigerant to cool the cooling agent, and wherein the low temperature refrigerator also functions as a heat supplying station that supplies heat from a condenser; and wherein the cooling agent comprises slush nitrogen that includes a mixture of fine particles of solid nitrogen and liquid nitrogen.

* * * * *